(12) United States Patent
Lenchner et al.

(10) Patent No.: US 11,182,725 B2
(45) Date of Patent: Nov. 23, 2021

(54) AUTOMATED PRODUCTIVITY MANAGEMENT VIA ELECTRONIC DOCUMENT TRACKING IN COMPUTING SYSTEMS

(71) Applicant: International Business Machines Corporation, Armonk, NY (US)

(72) Inventors: Jonathan Lenchner, Nairobi (KE); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 15/643,929

(22) Filed: Jul. 7, 2017

(65) Prior Publication Data

US 2019/0012628 A1    Jan. 10, 2019

(51) Int. Cl.
*G06Q 10/06* (2012.01)
*G06Q 10/10* (2012.01)

(52) U.S. Cl.
CPC ....... *G06Q 10/06398* (2013.01); *G06Q 10/10* (2013.01); *G06Q 10/101* (2013.01)

(58) Field of Classification Search
CPC ............ G06Q 10/06398; G06Q 10/10; G06Q 10/101; G06Q 10/063114; G06Q 10/06311
See application file for complete search history.

(56) References Cited

U.S. PATENT DOCUMENTS

| | | | | |
|---|---|---|---|---|
| 5,310,349 A * | 5/1994 | Daniels | ..................... | G09B 7/00 345/156 |
| 6,256,773 B1 * | 7/2001 | Bowman-Amuah | ..... | G06F 8/71 707/999.202 |
| 6,484,106 B1 * | 11/2002 | Schoch | ............... | B30B 15/0094 702/33 |
| 7,149,698 B2 * | 12/2006 | Guheen | ................. | G06Q 50/01 705/319 |
| 7,836,412 B1 * | 11/2010 | Zimmerman | ......... | G06F 40/103 715/827 |
| 8,195,475 B1 * | 6/2012 | Landsman | ............. | G16H 50/30 705/2 |
| 8,244,565 B2 | 8/2012 | Galvan | | |
| 10,949,066 B2 * | 3/2021 | Aguilar-Gamez | .... | G06F 3/0484 |
| 2002/0010563 A1 * | 1/2002 | Ratteree | ................. | G06Q 10/06 703/2 |

(Continued)

FOREIGN PATENT DOCUMENTS

AU         2013100931 A4     8/2013

OTHER PUBLICATIONS

Disclosed Anonymously, "Real-Time Optimization of Employee Productivity Using Workplace Mood Analysis," IPCOM000245225D, Feb. 18, 2016, 5 pages.

(Continued)

*Primary Examiner* — Jonathan G Sterrett
*Assistant Examiner* — Stephen S Swartz
(74) *Attorney, Agent, or Firm* — Samuel Waldbaum; Ryan, Mason & Lewis, LLP

(57) ABSTRACT

Productivity of at least one user in an environment is measured along one or more or more dimensions. Measuring the productivity of the at least one user comprises tracking one or more data items associated with an electronic document. One or more conditions that influence the measured productivity of the at least one user are identified. One or more suggestions for improving the productivity of the at least one user are generated based on the one or more identified conditions.

26 Claims, 4 Drawing Sheets

(56) References Cited

U.S. PATENT DOCUMENTS

| | | | |
|---|---|---|---|
| 2002/0188489 A1 | 12/2002 | Cheng et al. | |
| 2003/0106039 A1* | 6/2003 | Rosnow | G06Q 10/06 717/100 |
| 2003/0107596 A1 | 6/2003 | Jameson | |
| 2003/0155415 A1* | 8/2003 | Markham | G06Q 10/00 235/376 |
| 2006/0282306 A1* | 12/2006 | Thissen-Roe | G06Q 10/06 705/7.14 |
| 2007/0027652 A1* | 2/2007 | Hosagrahara | G06Q 10/04 702/182 |
| 2009/0006164 A1 | 1/2009 | Kaiser et al. | |
| 2009/0070163 A1* | 3/2009 | Angell | G06Q 10/04 705/7.26 |
| 2009/0222552 A1 | 9/2009 | Chroscielewski et al. | |
| 2010/0250343 A1 | 9/2010 | Lamoncha | |
| 2010/0318409 A1 | 12/2010 | Mayer et al. | |
| 2011/0302003 A1 | 12/2011 | Shirish et al. | |
| 2013/0073344 A1* | 3/2013 | Parent | G06Q 10/06 705/7.39 |
| 2015/0046233 A1* | 2/2015 | Srulowitz | G06Q 10/06398 705/7.42 |
| 2015/0310375 A1 | 10/2015 | Dutta et al. | |
| 2015/0363734 A1* | 12/2015 | Leboucher | G06Q 10/06316 705/7.26 |
| 2016/0132905 A1* | 5/2016 | Richards | G06Q 30/0201 705/7.23 |
| 2016/0148141 A1 | 5/2016 | Kwak | |
| 2016/0283887 A1* | 9/2016 | Jagyasi | G06Q 10/06398 |
| 2017/0052955 A1* | 2/2017 | Nandy | G06F 16/93 |
| 2018/0203425 A1* | 7/2018 | Anderson | G05B 11/01 |
| 2019/0266204 A1* | 8/2019 | Chandra | G06F 16/9538 |

OTHER PUBLICATIONS

P.Mell et al., "The NIST Definition of Cloud Computing: Recommendations of the National Institute of Standards and Technology," National Institute of Standards and Technology, U.S. Department of Commerce Special Publication 800-145, Sep. 2011, 7 pages.

* cited by examiner

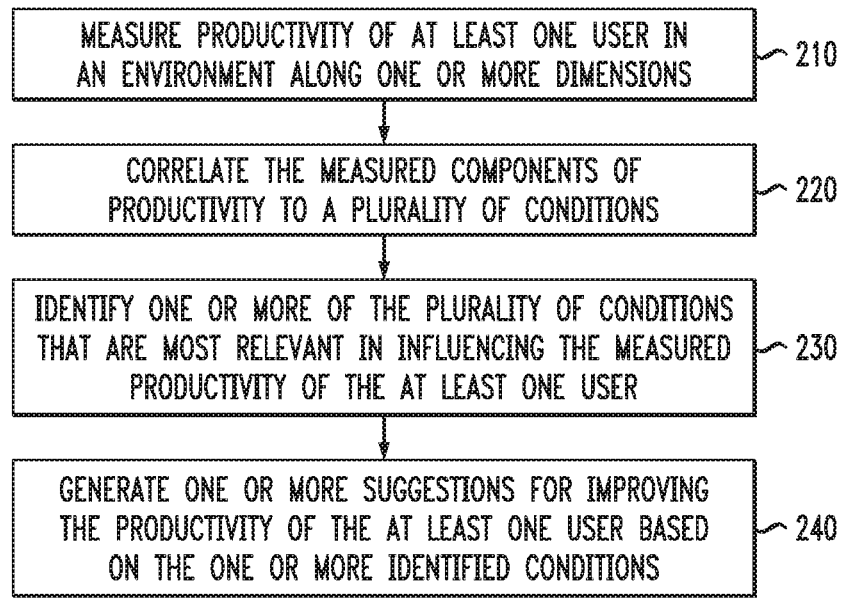
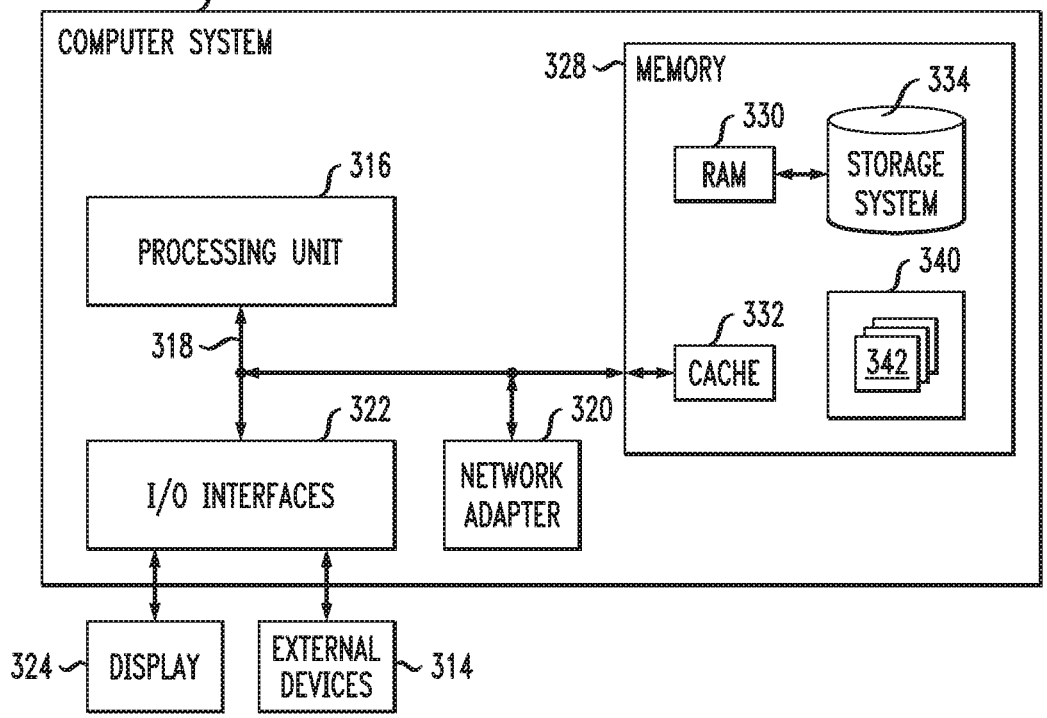

AUTOMATED PRODUCTIVITY MANAGEMENT VIA ELECTRONIC DOCUMENT TRACKING IN COMPUTING SYSTEMS

BACKGROUND

The present invention relates to productivity management, and more specifically, to utilizing automated productivity management for enhancing productivity.

Individuals or groups of individuals may be subject to various conditions that affect productivity. For example, some individuals may be more productive in the morning, while other individuals may be more productive in the evening. Productivity may be positively affected by setting personal goals and expectations of what ought to be done during a given day. In contrast, productivity may be negatively affected by conditions, such as environmental conditions, personal conditions, stresses, deadlines, etc. Individuals may be unaware of conditions that may have a negative effect on their productivity. Such individuals may struggle to be productive, regardless of attempts to be more productive, due to their lack of awareness of these productivity-reducing conditions.

SUMMARY

Embodiments provide techniques for improving productivity of individuals utilizing cognitive computing techniques.

In one embodiment, a method comprises the following steps. Productivity of at least one user in an environment is measured along one or more or more dimensions. Measuring the productivity of the at least one user comprises tracking one or more data items associated with an electronic document. One or more conditions that influence the measured productivity of the at least one user are identified. One or more suggestions for improving the productivity of the at least one user are generated based on the one or more identified conditions. The steps are implemented via at least one processing device comprising a processor operatively coupled to a memory.

In another embodiment, an apparatus comprises at least one processor operatively coupled to a memory. The processor is configured to: measure productivity of at least one user in an environment along one or more dimensions, wherein, in measuring the productivity of the at least one user, the processor is configured to track one or more data items associated with an electronic document; identify one or more conditions that influence the measured productivity of the at least one user; and generate one or more suggestions for improving the productivity of the at least one user based on the one or more identified conditions.

In yet another embodiment, an article of manufacture comprises a processor-readable storage medium having encoded therein executable code of one or more software programs. The one or more software programs when executed by the one or more processors perform the steps of: measuring productivity of at least one user in an environment along one or more dimensions, wherein measuring the productivity of the at least one user comprises tracking one or more data items associated with an electronic document; identifying one or more conditions that influence the measured productivity of the at least one user; and generating one or more suggestions for improving the productivity of the at least one user based on the one or more identified conditions.

These and other exemplary embodiments of the invention will be described in or become apparent from the following detailed description of exemplary embodiments, which is to be read in connection with the accompanying drawings.

BRIEF DESCRIPTION OF THE DRAWINGS

FIG. 2 illustrates a process for improving productivity of at least one user according to an embodiment of the invention.

FIG. 3 illustrates a computer system in accordance with which one or more components/steps of techniques of the invention may be implemented according to an embodiment of the invention.

DETAILED DESCRIPTION

Illustrative embodiments will be described below for improving productivity of at least one user in an environment utilizing cognitive computing. Cognitive computing describes platforms that encompass technologies such as machine learning, reasoning, natural language processing, etc. Cognitive computing may employ data mining, pattern recognition and/or other data processing techniques to provide for a self-learning cognitive system. A cognitive system may be, for example, adaptive (i.e., learn as information changes by consuming data in real-time or near real-time), interactive (i.e., interact easily with users or computing components to define the needs of the users), stateful (i.e., the way the system interacts either internally or with the environment depends on the condition of the system at a given instant of time, and may use prior interactions to return information suitable for the given instant of time), and/or contextual (i.e., understand, identify and extract contextual elements such as meaning, syntax, time, location, process, task, etc. via structured and/or unstructured data).

Illustrative embodiments provide cognitive computing techniques for measuring productivity of at least one user, and determining ways to improve the productivity of the at least one user. The illustrative embodiments may measure variations in productivity of the at least one user across various conditions in order to help the at least one user take positive steps to increase productivity during less productive conditions.

Figure 1:
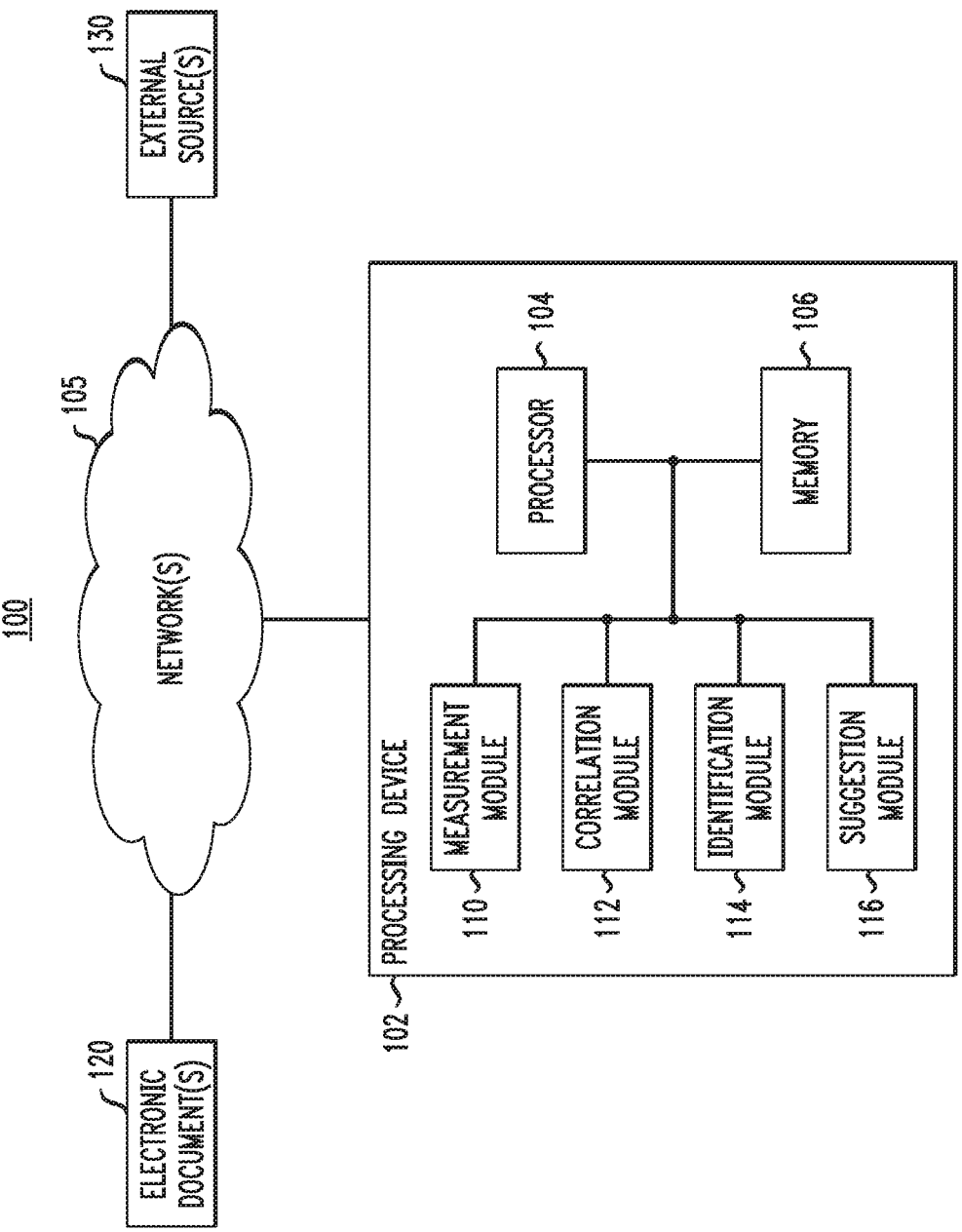
FIG. 1 illustrates a block diagram of a system with which one or more embodiments of the invention are implemented.

FIG. 1 illustrates a block diagram of a cognitive computing system, system 100, to improve productivity of at least one user in an environment. In FIG. 1, one or more communication networks, network(s) 105, are shown as the mechanism for coupling at least one processing device 102, electronic document(s) 120 and external sources 130.

Processing device 102 is shown comprising processor 104 operatively coupled to memory 106. Processing device 102 is further shown comprising a set of modules operatively coupled to processor 104 and configured to improve the productivity of at least one user in an environment utilizing cognitive computing techniques. In this illustrative embodiment, the set of modules include measurement module 110, correlation module 112, identification module 114 and suggestion module 116. Although each module 110-114 is shown as an individual module, the functionality of each module may be embodied as a single module, or as a combination of sub-combinations of modules. Accordingly, the organization of the modules depicted in FIG. 1 is not to be considered limiting.

Measurement module 110 is configured to measure productivity of at least one user (e.g., one or more individual users and/or one or more groups of users) in an environment along one or more dimensions. The one or more dimensions may comprise what is referred to herein as a creative productivity dimension and a learning productivity dimension. Creative productivity refers to the act of creating or editing content that makes its way into a finished electronic document of some sort (possibly after much reshaping). Learning productivity refers to the consumption of content that is similar to or is otherwise associated with the finished electronic document. For example, learning productivity may refer to the reading of textual content, listening to audio content, viewing of video content, etc. that is similar to or is otherwise associated with the finished electronic document.

In one embodiment, measurement module 110 is configured to measure the productivity of the at least one user along the creative productivity dimension by tracking one or more data items associated with an electronic document obtained from electronic document(s) 120 via network(s) 105. The electronic document may be part of, for example, an academic paper, a presentation, or any type of work product that may be produced electronically.

Electronic document(s) 120 may comprise one or more versions of an electronic document. In one embodiment, the measurement of the productivity of the at least one user along the creative productivity dimension by measurement module 110 comprises tracking a lineage of one or more data items incorporated in a final version of the electronic document (e.g., by tracking when the one or more data items were typed, created or copied). The purpose of tracking the lineage of a given data item is to track the given data item back to its genesis during the drafting process of the electronic document in order to assess a productivity value for the given data item. After the lineage of the one or more data items incorporated in the final version of the electronic document is tracked, one or more creative productivity factors associated with the one or more tracked data items are measured. For example, if the final version of the electronic document is an academic paper, the words or phrases that are comprised within the final version of the academic paper are tracked in order to measure the one or more creative productivity factors. Further details regarding measuring the productivity of the at least one user along the creative productivity dimension are provided below with reference to FIG. 2.

In one embodiment, measurement module 110 is configured to measure the productivity of the at least one user along the learning productivity dimension by tracking one or more external sources viewed by the at least one user (i.e., external source(s) 130) and measuring one or more learning productivity factors associated with external sources 130 that contain similar or the same textual or other data items. External source(s) 130 may comprise, for example, web pages, social media pages, e-mails, other electronic documents, etc. External source(s) 130 may also include audio or video content from web pages. In one embodiment, the audio or video content from web pages contains embedded transcriptions. In another embodiment, transcriptions can be dynamically generated for the audio or video content from web pages by measurement module 110. External source(s) 130 are analyzed to determine data items that correlate with the final version of the electronic document. Referring back to the example in which the electronic document is an academic paper, external sources (e.g., websites used to perform research in writing the academic paper) are analyzed to determine words or phrases that have a high correlation to the content within the final version of the academic paper. Further details regarding measuring the productivity of the at least one user along the one or more dimensions are provided below with reference to FIG. 2.

Thus, measurement module 110 measures the productivity of at least one user along the one or more dimensions by: (1) observing the at least one user entering data into electronic document(s) 120 or consuming content and (2) over time, noting how this content (either created or consumed) correlates with a stable finished work product. That is, the more connected to such a stable finished work product, the greater the productivity measure is assigned to activity by measurement module 110.

Correlation module 112 is configured to correlate the measured components of productivity to a plurality of conditions or factors. In one embodiment, the plurality of conditions comprise at least one of environmental conditions and personal conditions known for influencing productivity. Non-limiting examples of environmental conditions comprise time of day, day of the week, season, weather, temperature, humidity, presence of odors or allergens, and the presence of ambient noise. Non-limiting examples of personal conditions comprise mood, temperament, lack of sleep, food (e.g., hunger), presence of family and location (e.g., being at home or being away from home).

In one embodiment, correlation module 112 performs the correlation by scoring the at least one user for each productivity measure based on each of the plurality of conditions. The correlation may be embodied in a matrix. For example, the productivity measures for the at least one user may be placed in the columns of the matrix, and the plurality of conditions may be placed in the rows of the matrix. However, such an arrangement should be not be considered limiting. Additionally, it is to be understood that a matrix is purely an exemplary data structure for representing the correlation, and it is to be appreciated that the correlation may be embodied in any type of data structure in accordance with the embodiments described herein.

Identification module 114 is configured to identify one or more of the plurality of conditions that are most relevant in influencing the measured productivity of the at least one user. In one embodiment, identification module 114 is configured to identify the one or more conditions by determining how the presence or absence of each of the plurality of conditions influences the productivity of the at least one user. Identification module 114 is configured to employ one or more machine learning techniques in order to learn how the measured productivity of the at least one user is influenced by the one or more conditions. Any machine learning technique may be employed in accordance with the embodiments described herein. Further details regarding identifying the one or more conditions are provided below with reference to FIG. 2.

Suggestion module 116 is configured to generate one or more suggestions for improving the productivity of the at least one user based on the one or more identified conditions. In one embodiment, suggestion module 116 implements coaching functionality to increase productivity when the at least one user is exposed to conditions determined to correlate to low productivity. Further details regarding generating the one or more suggestions are provided below with reference to FIG. 2.

With reference to FIG. 2, a flowchart 200 is provided illustrating a cognitive computing process for improving productivity of at least one user in an environment.

At step 210, productivity of at least one user in an environment is measured along one or more dimensions. The productivity may be measured for one or more individual users and/or one or more groups of users. In one embodiment, measuring the productivity of the at least one user comprises tracking one or more data items associated with an electronic document. The one or more data items may include, but are not limited to, a word, a phrase, an expression, an image, a drawing, and a video. The electronic document may be part of, for example, an academic paper, a presentation, or any type of work product that may be produced electronically.

The productivity may be measured by tracking the data items in relation to a final version of the electronic document. The final version of the electronic document may be determined based on metadata associated with one or more versions of the electronic document. For example, the name of the electronic document may indicate that it is a final version (e.g., the name of the document comprises the word "final"). As another example, timestamp metadata may be used to determine the last version of the electronic document among the one or more versions of the electronic document.

In one embodiment, the one or more dimensions comprise one or more of a creative productivity dimension and a learning productivity dimension.

Measuring the productivity of the at least one user along the creative productivity dimension comprises tracking a lineage of the one or more data items incorporated in the final version of the electronic document, such as by tracking when the one or more data items are typed, created, copied, subsequently modified, etc. The purpose of tracking the lineage of a given data item is to track the given data item back to its genesis during the drafting process of the electronic document in order to assess a productivity value for the given data item.

After tracking the lineage of the one or more data items, one or more creative productivity factors associated with the one or more tracked data items are measured. In one embodiment, the one or more creative productivity factors comprise one or more of a quantity of data items being incorporated into the electronic document, an amount of time spent incorporating the one or more data items into the electronic document (e.g., by allocating productivity credit to each data item incorporated in the final version in a prorated fashion based on time spent incorporating each data item), and how directly the one or more data items are incorporated into the electronic document. For example, the one or more data items may be weighed based on how each data item is incorporated into the electronic document (e.g., if a given data item is entered into the electronic document and is subsequently deleted or modified, it may be considered to "count less" than if the given data item was found in the final version of document without modification).

For example, if the electronic document is an academic paper, the words or phrases that are comprised within the final version of the academic paper are tracked. Past versions of the academic paper may be discovered, such as by tracing a lineage of the files associated with the academic paper, in order to track a history of how each word or phrase had been incorporated into the academic paper. Words or phrases that were modified or otherwise deleted in creating the final version of the academic paper may be considered to "count less" than those words or phrases that made it into the final version of the academic paper.

Measuring the productivity of the at least one user along the learning productivity dimension comprises tracking one or more external sources viewed by the at least one user, and measuring one or more learning productivity factors associated with the one or more external sources that contain similar or the same data items. The external sources may include, for example, web pages, social media pages, e-mails, other electronic documents, etc. The external sources are analyzed to determine data items that correlate with the final version of the electronic document. Referring back to the example in which the electronic document is an academic paper, external sources (e.g., web pages used to perform research in writing the academic paper) are analyzed to determine words or phrases that have a high co-occurrence rate, or correlation, with words in the final version of the academic paper. In one embodiment, measuring the productivity of the at least one user along the learning productivity dimension further comprises weighing the one or more data items based on how each data item is featured in the electronic document.

Thus, step 210 measures the productivity of at least one user along the one or more dimensions by (1) observing the at least one user entering data into electronic document(s) 120 or consuming content and (2) over time, noting how this content (either created or consumed) correlates with a stable finished work product. That is, the more connected to such a stable finished work product, the greater the productivity measure is assigned to activity.

At step 220, a plurality of conditions or factors known for influencing productivity are correlated with the measured components of productivity. In one embodiment, performing the correlation at step 220 comprises scoring the at least one user for each productivity measure based on each of the plurality of conditions. The correlation may be embodied in a matrix. For example, the productivity measures for the at least one user may be placed in the columns of the matrix, and the plurality of conditions may be placed in the rows of the matrix. However, such an arrangement should be not be considered limiting. Additionally, it is to be understood that a matrix is purely an exemplary data structure for representing the correlation, and it is to be appreciated that the correlation may be embodied in any type of data structure in accordance with the embodiments described herein.

The plurality of conditions may comprise one or more environmental conditions known for influencing productivity. Non-limiting examples of environmental conditions comprise time of day, day of the week, season, weather, temperature, humidity, presence of odors or allergens, and the presence of ambient noise. In one embodiment, the ambient noise is differentiated to determine whether the ambient noise is music. If the ambient noise is music, a type or kind of the music may be determined. Determining whether the at least one user is listening to music, as well as the type of music, may be useful in determining whether music of the type being listened to has a positive or negative influence on the productivity of the at least one user. For example, if classical music is determined to be present in the ambient noise and the user is experiencing greater productivity during the period of listening to the classical music, classical music may be determined to be an environmental condition influencing the productivity of the at least one user.

The plurality of conditions may comprise one or more personal conditions known for influencing productivity. Non-limiting examples of personal conditions comprise mood, temperament, lack of sleep, food (e.g., hunger), presence of family and location (e.g., being at home or being away from home).

At step 230, one or more of the plurality of conditions that are most relevant in influencing the measured productivity of the at least one user are identified. In one embodiment, identifying the one or more conditions determining how the presence or absence of each condition of the set of conditions influences the productivity of the at least one user. For example, the measured productivity of the at least one user may fluctuate over time, and the identification performed at step 230 may identify periods of high and/or low productivity relative to an average productivity of the at least one user, and determine which conditions were present or absent during those periods of high and/or low productivity.

For example, if the at least one user is determined to have low measured productivity (e.g., below average productivity) after 5:00 PM, a conclusion may be drawn that the at least one user is less productive at the end of the work day. As another example, if the at least one user is determined to be less productive during times of cold weather relative to times of warm weather, then a conclusion may be drawn that cold weather has a negative effect on the productivity of the at least one user.

At step 240, one or more suggestions for improving the productivity of the at least one user are generated based on the one or more identified conditions. The one or more suggestions may comprise, for example, a situation to avoid or a situation to embrace in the environment in order to improve the productivity of the at least one user. For example, if it is learned that the at least one user is rather unproductive on a Friday but is rather productive on a Monday, a suggestion may be generated on Friday to wait for Monday to complete the work. The one or more suggestions may comprise a suggested alteration of the environment to improve the productivity of the at least one user. For example, if it is learned that the at least one user is rather unproductive in cold conditions, a suggestion may be generated to increase the temperature to improve productivity.

In one embodiment, the following assumptions are made in implementing the process of FIG. 2: (1) the at least one user is always attempting to be productive; (2) the at least one user has a series of tasks to do; and (3) the efforts of the at least one user, at least while working, are directed toward completing the series of tasks. The series of tasks may be understood in retrospect (e.g., once a stable version of a document has been completed). The stable version of the electronic document is assumed to be the final version. However, this assessment can change at a later time if a newer version of the electronic document is discovered.

Often times, individuals may work in groups or teams. Individual members of the group may become less productive, thereby impacting the morale and productivity of the entire group. Thus, the embodiments described herein may be applied to a group of users to improve the productivity of the group of users. For example, productivity of a group of users in an environment may be measured along one or more dimensions. After this measurement is done, a contribution of each user of the group may be tracked (e.g., productivity credit may be allocated to each user of the group), and the embodiments described herein may be implemented to offer suggestions to each user of the group to improve overall group productivity. The group productivity may be measured and the one or more conditions influencing the measured productivity may be identified in order to make suggestions about when the group should get together to be most productive.

One or more embodiments can make use of software running on a computer or workstation. With reference to FIG. 3, in a computing node 310 there is a system/server 312, which is operational with numerous other general purpose or special purpose computing system environments or configurations. Examples of well-known computing systems, environments, and/or configurations that may be suitable for use with system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

System/server 312 may be described in the general context of computer system executable instructions, such as program modules, being executed by a computer system. Generally, program modules may include routines, programs, objects, components, logic, data structures, and so on that perform particular tasks or implement particular abstract data types. System/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, system/server 312 is shown in the form of a computing device. The components of system/server 312 may include, but are not limited to, one or more processors or processing units 316, system memory 328, and bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 312 typically includes a variety of computer system readable media. Such media may be any available media that is accessible by system/server 312, and it includes both volatile and non-volatile media, removable and non-removable media.

The system memory 328 can include computer system readable media in the form of volatile memory, such as random access memory (RAM) 330 and/or cache memory 332. System/server 312 may further include other removable/non-removable, volatile/nonvolatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces.

As depicted and described herein, memory 328 may include at least one program product having a set (e.g., at least one) of program modules that are configured to carry out the functions of embodiments of the invention. A program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

System/server 312 may also communicate with one or more external devices 314 such as a keyboard, a pointing device, an external data storage device (e.g., a USB drive), display 324, one or more devices that enable a user to interact with system/server 312, and/or any devices (e.g., network card, modem, etc.) that enable system/server 312 to communicate with one or more other computing devices. Such communication can occur via I/O interfaces 322. Still yet, system/server 312 can communicate with one or more networks such as a LAN, a general WAN, and/or a public network (e.g., the Internet) via network adapter 320. As depicted, network adapter 320 communicates with the other components of system/server 312 via bus 318. It should be understood that although not shown, other hardware and/or software components could be used in conjunction with system/server 312. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
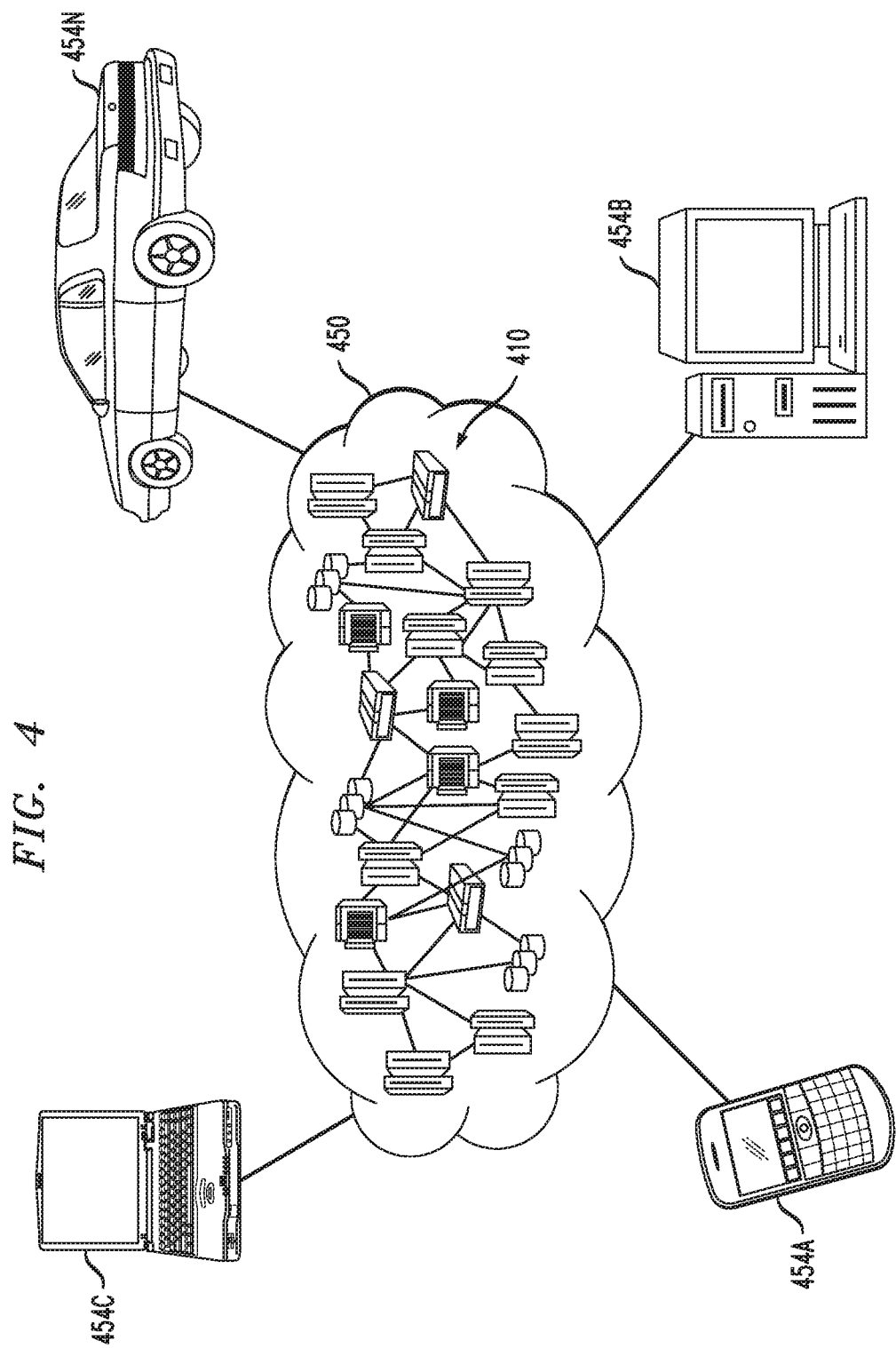
FIG. 4 illustrates a cloud computing environment according to an embodiment of the invention.

Referring now to FIG. 4, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
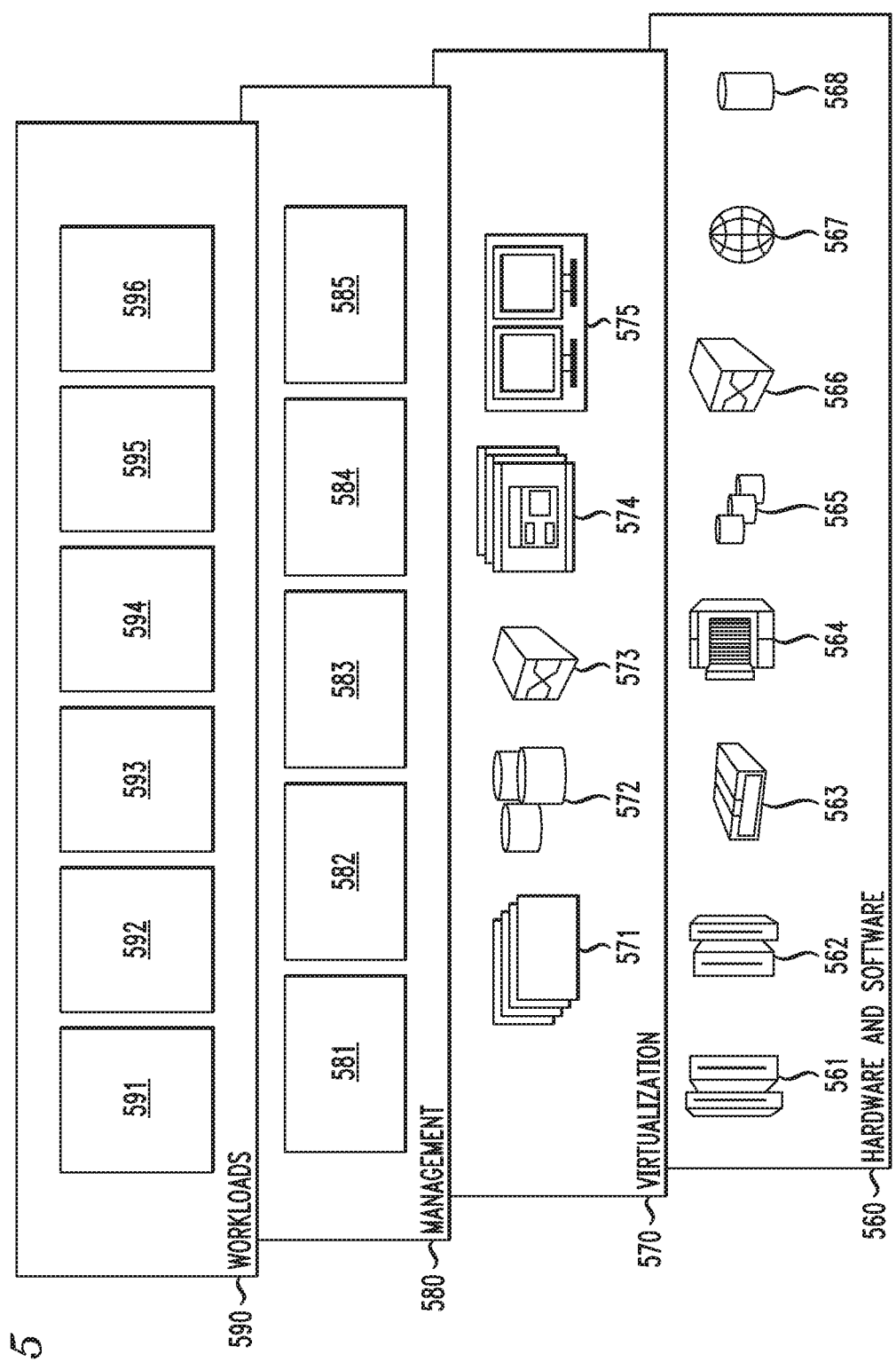
FIG. 5 illustrates abstraction model layers according to an embodiment of the invention.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: productivity measurement 591; software development and lifecycle management 592; machine learning 593; data analytics processing 594; transaction processing 595; and suggestion generation 596, which may perform various functions described above.

The embodiments described herein advantageously improve productivity using cognitive computing techniques. For example, the embodiments described herein advantageously measure productivity over one or more dimensions, and correlate the measured productivity to factors that may be influencing productivity using machine learning and/or other cognitive computing techniques in order to make suggestions regarding how to increase productivity during times predicted to be associated with low productivity. The embodiments described herein can be implemented to improve the productivity of individual users, or to improve the productivity of a group of users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   measuring, with logic of a measurement module of a processor, components of productivity of two or more users in a group of users in an environment along one or more dimensions, wherein measuring the components of productivity of the two or more users in the group of users comprises tracking one or more data items associated with an electronic document accessed by the two or more users in the group of users and comparing the one or more data items with at least one of a subsequent version and a final version of the electronic document;
   identifying a plurality of conditions that influence the measured components of productivity of the two or more users in the group of users;
   correlating, with logic of a correlation module of the processor, the measured components of productivity with the conditions to provide one or more correlation indicators, the one or more correlation indicators representative of productivity measurements of the two or more users in the group of users based on the conditions;
   determining a group productivity for the group of users by tracking contributions of the two or more users in the group of users, the contributions of the two or more users being based on the measured components of productivity of the two or more users in the group of users; and
   generating, with logic of a suggestion module of the processor based on the one or more correlation indicators, one or more suggestions for improving the group productivity for the group of users;
   wherein correlating comprises correlating the measured productivity of the two or more users in the group of users with the conditions known to influence productivity by implementing one or more cognitive computing processes, wherein the conditions are identified based on the correlation indicators detected at least in part by the cognitive computer processes;
   wherein the conditions comprise environmental conditions or personal conditions influencing the productivity of the two or more users in the group of users;
   wherein the one or more dimensions comprise at least one of a creative productivity dimension and a learning productivity dimension, wherein the creative productivity dimension is a dimension associated with creating or editing content associated with the electronic document, and wherein the learning productivity dimension is a dimension associated with consumption of content associated with the electronic document;
   wherein measuring the components of productivity of the two or more users in the group of users in the environment along the learning productivity dimension comprises tracking one or more external sources viewed by the two or more users in the group of users and measuring one or more learning productivity factors associated with the one or more external sources by determining whether the one or more external sources comprise content that is correlated with content with one or more of the data items in the at least one of the subsequent version and the final version of the electronic document;

wherein generating the one or more suggestions comprises utilizing the one or more learning productivity factors measured by tracking the one or more external sources in one or more machine learning algorithms to determine one or more times predicted to be associated with low productivity for the group of users and generating at least one suggestion for increasing group productivity for the group of users at the determined one or more times predicted to be associated with low productivity for the group of users; and wherein the steps of the method are performed via at least one processing device comprising the processor operatively coupled to a memory.

2. The method of claim 1, wherein the one or more data items comprise one or more of at least one keyword, at least one expression, at least one image, at least one drawing, audio content and video content.

3. The method of claim 1, wherein measuring the productivity of the at least one user along the creative productivity dimension comprises tracking the one or more data items as the one or more data items are being incorporated into the electronic document, and measuring one or more creative productivity factors associated with the one or more tracked data items being incorporated into the electronic document.

4. The method of claim 3, wherein the one or more creative productivity factors comprise one or more of a quantity of data items being incorporated into the electronic document, an amount of time spent incorporating the one or more data items into the electronic document, and how directly the one or more data items are incorporated into the at least one of the subsequent version and the final version of the electronic document.

5. The method of claim 3, wherein measuring the productivity of the two or more users in the group of users along the creative productivity dimension further comprises weighing the one or more data items based on how each data item is incorporated into the at least one of the subsequent version and the final version of the electronic document.

6. The method of claim 1, wherein measuring the one or more learning productivity factors associated with the one or more external sources comprises determining whether respective ones of the one or more external sources contain data items similar to or the same as the data items in the at least one of the subsequent version and the final version of the electronic document.

7. The method of claim 6, wherein measuring the productivity of the two or more users in the group of users along the learning productivity dimension further comprises weighing the one or more data items based on how each data item is featured in the at least one of the subsequent version and the final version of the electronic document.

8. The method of claim 1, further comprising placing the measured productivity on a time scale, and mapping the measured productivity to determine a time associated with a highest productivity.

9. The method of claim 1, wherein the environmental conditions comprise one or more of time of day, day of week, season, weather, temperature, humidity, odor, presence of an odor, presence of an allergen, and presence of ambient noise.

10. The method of claim 9, wherein the ambient noise comprises music associated with a type of music.

11. The method of claim 1, wherein the personal conditions comprise one or more of mood, temperament, lack of sleep, food, presence of family and location.

12. The method of claim 1, wherein at least one of the one or more suggestions for improving the group productivity for the group of users comprise at least one of a situation to avoid and a situation to embrace to improve at least one of the productivity measurements of at least one of the two or more users in the group of users.

13. The method of claim 1, wherein at least one of the one or more suggestions for improving the group productivity for the group of users comprises a suggested alteration of the environment to improve at least one of the productivity measurements of at least one of the two or more users in the group of users.

14. An apparatus, comprising:
at least one processor operatively coupled to a memory and configured to:
measure components of productivity of two or more users in a group of users in an environment along one or more dimensions, wherein measuring the components of productivity of the two or more users in the group of users comprises tracking one or more data items associated with an electronic document accessed by the two or more users in the group of users and comparing the one or more data items with at least one of a subsequent version and a final version of the electronic document;
identify a plurality of conditions that influence the measured components of productivity of the two or more users in the group of users;
correlate the measured components of productivity with the conditions to provide one or more correlation indicators, the one or more correlation indicators representative of productivity measurements of the two or more users in the group of users based on the conditions;
determine a group productivity for the group of users by tracking contributions of the two or more users in the group of users, the contributions of the two or more users being based on the measured components of productivity of the two or more users in the group of users; and
generate, based on the one or more correlation indicators, one or more suggestions for improving the group productivity for the group of users;
wherein correlating comprises correlating the measured productivity of the two or more users in the group of users with the conditions known to influence productivity by implementing one or more cognitive computing processes, wherein the conditions are identified based on the correlation indicators detected at least in part by the cognitive computer processes;
wherein the conditions comprise environmental conditions or personal conditions influencing the productivity of the two or more users in the group of users;
wherein the one or more dimensions comprise at least one of a creative productivity dimension and a learning productivity dimension, wherein the creative productivity dimension is a dimension associated with creating or editing content associated with the electronic document, and wherein the learning productivity dimension is a dimension associated with consumption of content associated with the electronic document;

wherein measuring the productivity of the two or more users in the group of users in the environment along the learning productivity dimension comprises tracking one or more external sources viewed by the two or more users in the group of users and measuring one or more learning productivity factors associated with the one or more external sources by determining whether the one or more external sources comprise content that is correlated with content with one or more of the data items in the at least one of the subsequent version and the final version of the electronic document; and wherein generating the one or more suggestions comprises utilizing the one or more learning productivity factors measured by tracking the one or more external sources in one or more machine learning algorithms to determine one or more times predicted to be associated with low productivity for the group of users and generating at least one suggestion for increasing group productivity for the group of users at the determined one or more times predicted to be associated with low productivity for the group of users.

15. An article of manufacture comprising a processor-readable storage medium having encoded therein executable code of one or more software programs, wherein the one or more software programs when executed by one or more processors perform the steps of:

measuring components of productivity of two or more users in a group of users in an environment along one or more dimensions, wherein measuring the components of productivity of the two or more users in the group of users comprises tracking one or more data items associated with an electronic document accessed by the two or more users in the group of users and comparing the one or more data items with at least one of a subsequent version and a final version of the electronic document;

identifying a plurality of conditions that influence the measured components of productivity of the two or more users in the group of users;

correlating the measured components of productivity with the conditions to provide one or more correlation indicators, the one or more correlation indicators representative of productivity measurements of the two or more users in the group of users based on the conditions;

determining a group productivity for the group of users by tracking contributions of the two or more users in the group of users, the contributions of the two or more users being based on the measured components of productivity of the two or more users in the group of users; and generating, based on the one or more correlation indicators, one or more suggestions for improving the group productivity for the group of users;

wherein correlating comprises correlating the measured productivity of the two or more users in the group of users with the conditions known to influence productivity by implementing one or more cognitive computing processes, wherein the conditions are identified based on the correlation indicators detected at least in part by the cognitive computer processes;

wherein the conditions comprise environmental conditions or personal conditions influencing the productivity of the two or more users in the group of users;

wherein the one or more dimensions comprise at least one of a creative productivity dimension and a learning productivity dimension, wherein the creative productivity dimension is a dimension associated with creating or editing content associated with the electronic document, and wherein the learning productivity dimension is a dimension associated with consumption of content associated with the electronic document;

wherein measuring the components of productivity of the two or more users in the group of users in the environment along the learning productivity dimension comprises tracking one or more external sources viewed by the two or more users in the group of users and measuring one or more learning productivity factors associated with the one or more external sources by determining whether the one or more external sources comprise content that is correlated with content with one or more of the data items in the at least one of the subsequent version and the final version of the electronic document; and wherein generating the one or more suggestions comprises utilizing the one or more learning productivity factors measured by tracking the one or more external sources in one or more machine learning algorithms to determine one or more times predicted to be associated with low productivity for the group of users and generating at least one suggestion for increasing group productivity for the group of users at the determined one or more times predicted to be associated with low productivity for the group of users.

16. The apparatus of claim 14, wherein:

the environmental conditions comprise one or more of time of day, day of week, season, weather, temperature, humidity, odor, presence of an odor, presence of an allergen, and presence of ambient noise; and the personal conditions comprise one or more of mood, temperament, lack of sleep, food, presence of family and location.

17. The article of manufacture of claim 15, wherein:

the environmental conditions comprise one or more of time of day, day of week, season, weather, temperature, humidity, odor, presence of an odor, presence of an allergen, and presence of ambient noise; and the personal conditions comprise one or more of mood, temperament, lack of sleep, food, presence of family and location.

18. A computer program product comprising a non-transitory computer readable storage medium having program instructions embodied therewith, the program instructions executable by one or more processors to cause the program instructions to:

measure components of productivity of at least one user in a group of users in an environment along one or more dimensions, wherein measuring the components of productivity of the at least one user in the group of users comprises tracking one or more data items associated with an electronic document accessed by the at least one user in the group of users and comparing the one or more data items with at least one of a subsequent version and a final version of the electronic document;

identify a plurality of conditions that influence the measured components of productivity of the at least one user in the group of users;

correlate the measured components of productivity with the conditions to provide one or more correlation indicators, the one or more correlation indicators representative of productivity measurements of the at least one user in the group of users based on the conditions;

determining a group productivity for the group of users by tracking contributions of the at least one user and one or more other users in the group of users, the contribution of the at least one user in the group of users being based on the measured components of productivity of the at least one user in the group of users; and generate, based on the one or more correlation indicators one or more suggestions for the at least one user in the group of users to improve the group productivity for the group of users;

wherein correlating comprises correlating the measured productivity of the at least one user in the group of users with the conditions known to influence productivity by implementing one or more cognitive computing processes, wherein the conditions are identified based on the correlation indicators detected at least in part by the cognitive computer processes;

wherein the conditions comprise environmental conditions or personal conditions influencing the productivity of the at least one user in the group of users; and wherein the one or more dimensions comprise at least one of a creative productivity dimension and a learning productivity dimension, wherein the creative productivity dimension is a dimension associated with creating or editing content associated with the electronic document, and wherein the learning productivity dimension is a dimension associated with consumption of content associated with the electronic document;

wherein measuring the components of productivity of the at least one user in the group of users in the environment along the learning productivity dimension comprises tracking one or more external sources viewed by the two or more users in the group of users and measuring one or more learning productivity factors associated with the one or more external sources by determining whether the one or more external sources comprise content that is correlated with content with one or more of the data items in the at least one of the subsequent version and the final version of the electronic document; and wherein generating the one or more suggestions comprises utilizing the one or more learning productivity factors measured by tracking the one or more external sources in one or more machine learning algorithms to determine one or more times predicted to be associated with low productivity for the group of users and generating at least one suggestion for increasing group productivity for the group of users at the determined one or more times predicted to be associated with low productivity for the group of users.

19. The computer program product of claim 18, wherein:
the environmental conditions comprise one or more of time of day, day of week, season, weather, temperature, humidity, odor, presence of an odor, presence of an allergen, and presence of ambient noise; and
the personal conditions comprise one or more of mood, temperament, lack of sleep, food, presence of family and location.

20. A cognitive computing system, comprising:
at least one processor operatively coupled to a memory and configured to:
measure components of productivity of at least one user in a group of users in an environment along one or more dimensions, wherein measuring the components of productivity of the at least one user in the group of users comprises tracking one or more data items associated with an electronic document accessed by the at least one user in the group of users and comparing the one or more data items with at least one of a subsequent version and a final version of the electronic document;

identify a plurality of conditions that influence the measured components of productivity of the at least one user in the group of users;

correlate the measured components of productivity with the conditions to provide one or more correlation indicators, the one or more correlation indicators representative of productivity measurements of the at least one user in the group of users based on the conditions;

determine a group productivity for the group of users by tracking contributions of the at least one user and one or more other users in the group of users, the contribution of the at least one user in the group of users being based on the measured components of productivity of the at least one user in the group of users; and generate, based on the one or more correlation indicators, one or more suggestions for the at least one user in the group of users to improve the group productivity for the group of users;

wherein correlating comprises correlating the measured productivity of the at least one user in the group of users with the conditions known to influence productivity by implementing one or more cognitive computing processes, wherein the conditions are identified based on the correlation indicators detected at least in part by the cognitive computer processes;

wherein the conditions comprise environmental conditions or personal conditions influencing the productivity of the at least one user in the group of users;

wherein the one or more dimensions comprise at least one of a creative productivity dimension and a learning productivity dimension, wherein the creative productivity dimension is a dimension associated with creating or editing content associated with the electronic document, and wherein the learning productivity dimension is a dimension associated with consumption of content associated with the electronic document;

wherein measuring the components of productivity of the at least one user in the group of users in the environment along the learning productivity dimension comprises tracking one or more external sources viewed by the two or more users in the group of users and measuring one or more learning productivity factors associated with the one or more external sources by determining whether the one or more external sources comprise content that is correlated with content with one or more of the data items in the at least one of the subsequent version and the final version of the electronic document; and wherein generating the one or more suggestions comprises utilizing the one or more learning productivity factors measured by tracking the one or more external sources in one or more machine learning algorithms to determine one or more times predicted to be associated with low productivity for the group of users and generating at least one suggestion for increasing group productivity for the group of users at the determined one or more times predicted to be associated with low productivity for the group of users.

21. The cognitive computing system of claim 20, wherein:
the environmental conditions comprise one or more of time of day, day of week, season, weather, temperature, humidity, odor, presence of an odor, presence of an allergen, and presence of ambient noise; and
the personal conditions comprise one or more of mood, temperament, lack of sleep, food, presence of family and location.

22. The method of claim 1, wherein at least one of the one or more suggestions for improving the group productivity for the group of users comprises a suggested time at which the two or more users in the group of users should work together to increase productivity.

23. The method of claim 1, wherein the one or more external sources comprise at least one of audio content and video content, and wherein determining whether the one or more external sources comprise content that is correlated with content with one or more of the data items in the at least one of the subsequent version and the final version of the electronic document comprises:
parsing embedded text transcription data in said at least one of the audio content and the video content; and
matching one or more text terms in the embedded text transcription data with one or more text terms in one or more of the data items in the at least one of the subsequent version and the final version of the electronic document.

24. The method of claim 1, wherein the one or more external sources comprise at least one of audio content and video content, and wherein determining whether the one or more external sources comprise content that is correlated with content with one or more of the data items in the at least one of the subsequent version and the final version of the electronic document comprises:
dynamically generating text transcription data for said at least one of the audio content and the video content; and
matching one or more text terms in the embedded text transcription data with one or more text terms in one or more of the data items in the at least one of the subsequent version and the final version of the electronic document.

25. The cognitive computing system of claim 20, wherein the one or more external sources comprise at least one of audio content and video content, and wherein determining whether the one or more external sources comprise content that is correlated with content with one or more of the data items in the at least one of the subsequent version and the final version of the electronic document comprises:
parsing embedded text transcription data in said at least one of the audio content and the video content; and
matching one or more text terms in the embedded text transcription data with one or more text terms in one or more of the data items in the at least one of the subsequent version and the final version of the electronic document.

26. The cognitive computing system of claim 20, wherein the one or more external sources comprise at least one of audio content and video content, and wherein determining whether the one or more external sources comprise content that is correlated with content with one or more of the data items in the at least one of the subsequent version and the final version of the electronic document comprises:
dynamically generating text transcription data for said at least one of the audio content and the video content; and
matching one or more text terms in the embedded text transcription data with one or more text terms in one or more of the data items in the at least one of the subsequent version and the final version of the electronic document.

* * * * *